June 30, 1953  E. W. DOUGLASS  2,643,941
APPARATUS FOR CRYSTALLIZING CHEMICAL SALTS
Filed Oct. 21, 1948  3 Sheets-Sheet 1
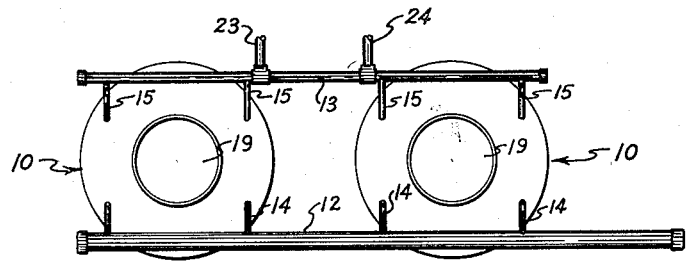
FIG.—1
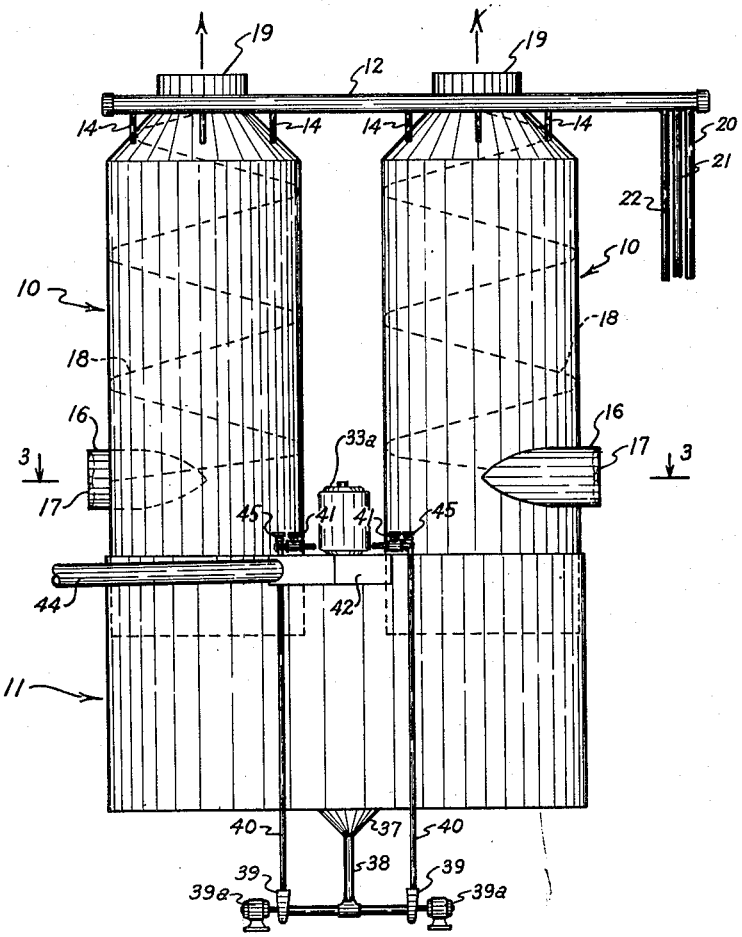
FIG.—2
*INVENTOR.*
Emory W. Douglass
BY
ATTORNEY June 30, 1953   E. W. DOUGLASS   2,643,941
APPARATUS FOR CRYSTALLIZING CHEMICAL SALTS
Filed Oct. 21, 1948   3 Sheets-Sheet 2

INVENTOR.
Emory W. Douglass
BY
ATTORNEY

June 30, 1953  E. W. DOUGLASS  2,643,941
APPARATUS FOR CRYSTALLIZING CHEMICAL SALTS
Filed Oct. 21, 1948  3 Sheets-Sheet 3
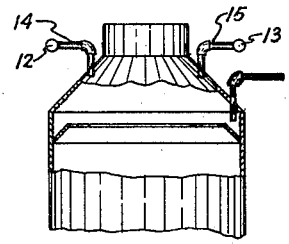
FIG.-5
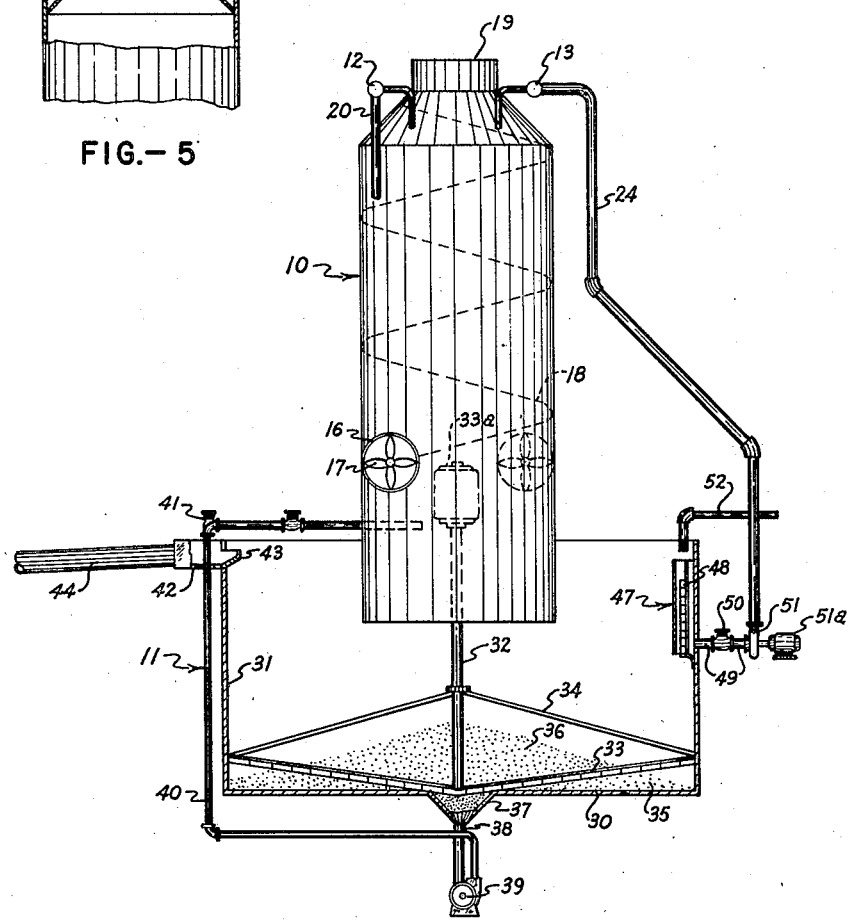
FIG.-4
FIG.-6
INVENTOR.
Emory W. Douglass
BY
ATTORNEY Patented June 30, 1953

2,643,941

UNITED STATES PATENT OFFICE 2,643,941

APPARATUS FOR CRYSTALLIZING CHEMICAL SALTS

Emory W. Douglass, Carlsbad, N. Mex., assignor to Potash Company of America, Denver, Colo., a corporation of Colorado Application October 21, 1948, Serial No. 55,822

9 Claims. (Cl. 23—273)

1

This invention relates to improvements in the atmospheric cooling of brine compositions and an improved process of refining certain minerals containing some constituents which are soluble in a liquid.

One object of the present invention is to provide an improved cooling unit for the direct atmospheric cooling of refinery brine.

A further object is to provide an improved cooling unit for use in a process for crystallization and collection of soluble minerals.

A still further object is to provide an improved process for the separation and crystallization of soluble minerals.

Further objects of the invention will be apparent from the following description and drawings.

While this apparatus is of general utility in any process where it is necessary or desirable to cool a liquid, it is particularly adapted for use in a process for separating soluble constituents from certain ores, of the general type of treatment disclosed in the patents to Weinig No. 2,188,932 and No. 2,211,397. As disclosed in these patents, a sylvinite ore consisting mainly of sodium chloride and potassium chloride crystals, together with small amounts of other minerals are ground to a finely-divided condition in a saturated water solution of the ore and this pulp mixed with suitable reagents is subjected to a froth flotation process where the potassium chloride is separated from the sodium chloride. Froth from the flotation process, carrying potassium chloride and a warm, saturated solution from a sodium chloride thickener, as in Patent No. 2,188,932, or pulp from the flotation cells containing practically pure potassium chloride and a warm solution from a sodium chloride thickener as in Patent No. 2,211,397 is passed into the cooling agitator where the potassium chloride in the solution crystallizes due to the lower temperature and the presence of potassium chloride in solid form to act as seed. From the cooling agitator, the pulp is subjected to a liquid solids separation, where the potassium chloride solids are separated and go to filters or a centrifuge for final dewatering. The pulp first goes through a dewaterer, the solids going to filters or a centrifuge, and the overflow from the dewaterer containing some finely divided particles of potassium chloride is passed to a potassium chloride thickener where the particles are permitted to settle out. The pulp underflow from the thickener also goes to the filters or centrifuge, and the separated liquid is passed to stock tanks and later recycled through the treatment.

The apparatus of the present invention is intended to either replace the cooling agitators in either of the above processes, to be used in place of the cooling agitators, dewaterer and potassium chloride thickener with the pulp underflow going directly to the filters or centrifuge, or may in the preferred use of the apparatus be installed between the cooling agitators and the thickener.

The apparatus consists broadly of a cooling chamber into which is sprayed a saturated solution of potassium chloride or other brine, and through which is passed a high velocity blast of air. The cooling effect of the air blast coming into intimate contact with the brine reduces the temperature of the brine as it drops into the thickener mounted below the cooling chamber. The cooling chamber may be provided with helical vanes to induce a whirlwind movement of the air, and the airflow is preferably contrary to the movement of the sprayed solution. In the thickener crystallization of the potassium chloride takes place due to the drop in temperature and the presence of potassium chloride in solid form to act as seed for the crystal growth. The crystals of potassium chloride settle to the bottom of the thickener forming a pulp which is scraped into a sump. A portion of the pulp may be pumped from the sump to a secondary thickener, to the dewaterer, or directly to the filters or centrifuge, depending upon the particular application. A connection is provided to bypass part of the pulp back into the thickener, when desired, to maintain pulp density. The overflow from the thickener is pumped to additional spray heads in the cooling chamber.

The invention will be better understood by reference to the accompanying drawings in which:

Fig. 1 is a plan view of the upper portion of the cooling towers showing the feed headers;

Fig. 2 is a side elevational view of the apparatus;

Fig. 4 is a sectional view taken on line 4—4 of Fig. 3;

Fig. 5 is a side elevational view of the upper portion of one of the towers partially broken away; and Fig. 6 is a partial sectional view showing one of the spray heads on an enlarged scale.

Figure 3:
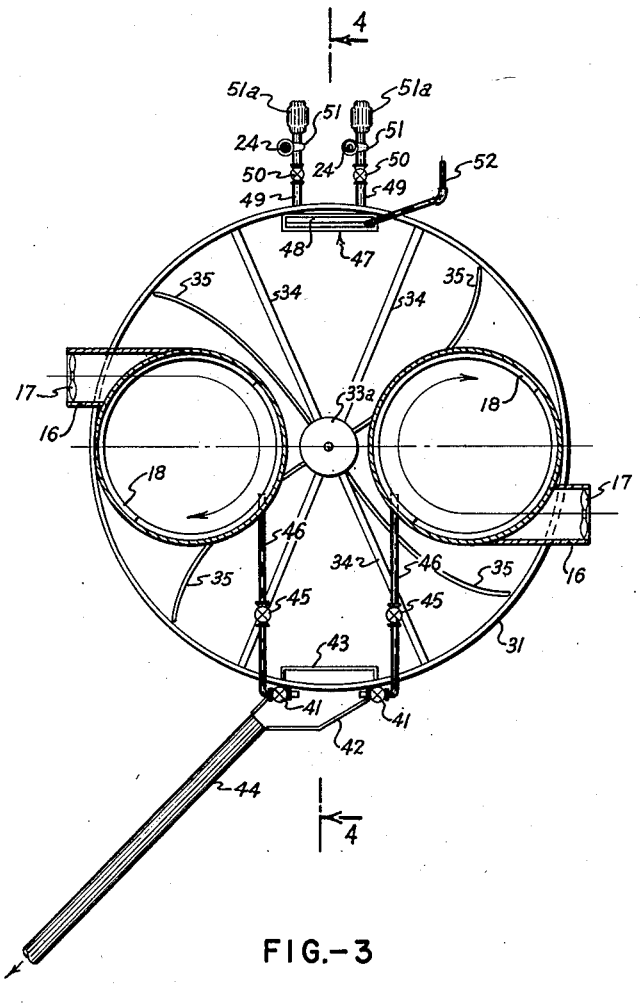
Fig. 3 is a sectional view taken on line 3—3 of Fig. 2.

The invention will be described with reference to one preferred use of the apparatus in the crystallization of KCl, but it will be understood, that it may be used in any similar process for crystallizing a salt in solution.

Referring now to Figs. 2 and 4 in the drawings, two cooling towers 10 are shown mounted above a potassium chloride thickener 11. The cooling towers 10 are provided with headers 12 and 13 which in turn are provided with a plurality of spray inlet pipes 14 and 15 which pass through the upper portion of the cooling towers. Adjacent the lower portion of the cooling towers 10, air conduits 16 are mounted tangentially with respect to the outer periphery of the cooling towers. The conduits have mounted therein fans 17 which direct the air inwardly. Helical vanes 18 mounted on the interior wall of the cooling towers produce a whirlwind movement of the air upwardly through the openings 19 in the top of the cooling towers. Header 12 is provided with a plurality of inlet pipes 20, 21 and 22, and header 13 is provided with a plurality of inlet pipes 23 and 24. As shown in detail in Fig. 6, spray pipes 14 and 15 are provided with splash plates 25 mounted directly below the opening thereof and attached to the pipes by bracket 26 and clamps 27. Below the openings 19, a gutter 28 is mounted around the internal periphery of the cooling towers. Flushing pipe 29 enters the cooling towers directly above the gutter 28 to provide a flow of liquid for flushing and cleaning the internal surfaces of the cooling towers. Directly below the cooling towers is mounted the thickener vat 11 which is provided with the bottom wall 30 and a cylindrical side wall 31. Mounted on a vertical shaft 32 is a rotary scraper member 33 supported by braces 34. Scraper 33 is driven by a motor 33a and has a plurality of scraper blades 35 inclined in such a manner as to work the pulp indicated at 36 radially inward toward the sump 37. Pulp is withdrawn through conduit 38 by means of pumps 39 driven by motors 39a which direct the pulp upwardly through conduits 40. Conduits 40 have valves 41 directing a portion of the pulp into launder 42 where it is mixed with the brine overflow from the thickener over weir 43, which mixture discharges through the conduit 44 into a secondary thickener (not shown). Another portion of the pulp is directed through valves 45 and conduits 46 back into the cooling towers just above the brine level to aid in dissipating super-saturation of potassium chloride in the cool brine sprayed through the towers. An adjustable weir 47 is mounted on the opposite side of the thickener vat at a slightly lower level than weir 43. Adjustable weir 47 is provided with a plurality of horizontal slats 48 which can be removed to vary the height of the weir. The top of weir 47 is maintained below the level of weir 43 in order to provide positive circulation of the brine through conduits 49 and valves 50 by pump 51. Pumps 51 which are driven by motor 51a recirculate the brine through conduits 24 into header 13. A conduit 52 brings in the brine filtrate from the filters (not shown), which is mixed with a portion of the overflow brine adjacent weir 47.

In the operation of the apparatus in this preferred embodiment brine from the cooling agitators is forced under pressure through inlet pipes 20, 21 and 22 into the header 12. From header 12, the brine goes through the spray pipes 14 and, striking splash plates 25, it is broken up into a fine spray which drops by gravity through the cooling towers 10. Brine from overflow weir 47 mixed with the filtrate from conduit 52 is pumped through conduits 24 to header 13 and thence through spray pipes 15 onto similar splash plates 25.

A high velocity blast of air from fans 17 enters the cooling towers tangentially through conduits 16 and is directed spirally upward by helical vanes 18 to produce a whirlwind movement of air through the cooling towers.

The brine spray falling downwardly comes into intimate contact with the upwardly moving air and a portion of the water in the brine is evaporated producing a cooling effect on the brine and also concentrating the solution. Thus the brine falling into the thickener vat is a super-saturated solution of KCl.

When the super-saturated solution falls into the thickener vat, KCl is crystallized out of solution due to the lower temperature and presence of solid crystals of KCl to act as seed.

The mass of crystals which settles in the brine to the bottom of the thickener vat is called pulp, as indicated at 36, and is moved inwardly toward the sump 37 by the rotary scraper blades 35.

The pulp 36 is pumped from sump 37 through conduit 40 where a portion is directed back into the lower part of the cooling tower just above the brine level to maintain the pulp density in thickener vat 11 at the proper point for promoting crystallization in the incoming cooled brine from the cooling tower.

Another portion of the pulp flows into launder 42 where it is mixed with the overflow brine from thickener vat 11 which flows over weir 43 and thence the mixture flows to a secondary thickener for further treatment. The addition of brine to the pulp is provided to facilitate the flow by gravity to the secondary thickener.

A second overflow at a lower level over adjustable weir 48 provides a constant flow of brine to pumps 51 for recirculation through the cooling towers. If the supply of brine from outside sources such as the cooling agitator, dewaterer, filters, or the flotation cells is not sufficient to maintain the brine level at a point to supply brine to pumps 51 over overflow 47, slats 48 can be removed until flow is again established.

Under normal operation the brine level will be as indicated in Fig. 4 with some brine passing over overflow 43 into launder 42 and some passing over overflow 47 and mixed with filtrate being recirculated by pumps 51 through the cooling towers.

At certain intervals, it is desirable to wash down the inner walls of the cooling towers and gutters 28 are provided for this purpose. Brine may run into the gutters by a hose (not shown) inserted through the top opening 19 or preferably by a supply pipe 29. The brine overflows the gutter and runs down the walls washing off any incrustations of solid material which may accumulate.

The operation of the apparatus may be modified in many respects. The flow to inlet pipes 20, 21 and 22 may be from one or more sources of concentrated brine. It may be all from the cooling agitators as indicated above or part may be filtrate from the filters, part from the NaCl thickeners and part directly from the flotation process. The pulp may go to another thickener vat or may go directly to filters or a centrifuge.

The apparatus may also be used in the crystallization of any salts or other minerals held in solution where the lowering of the temperature and/or the presence of seed crystals will facilitate the crystallization process.

What I desire to claim and secure by Letters Patent is:

1. An atmospheric crystallizer cooling unit comprising an elongated, upright hollow cooling tower having an open top and open bottom, a plurality of spray heads mounted near the open top, a tangential air inlet in the tower near the open bottom, helical vanes secured to the inner surface of said tower for directing air in a spirally upward path through the tower, a vat below the tower and conduit means for recycling the material from the lower portion of the vat to the upper portion thereof at a level below the air inlet.

2. An atmospheric crystallizer cooling unit comprising an elongated, upright hollow cooling tower having an open top and open bottom, a plurality of spray heads mounted near the open top, a tangential air inlet in the tower near the open bottom, helical vanes secured to the inner surface of said tower for directing air in a spirally upward path through the tower, a vat below the tower having side walls extending upwardly around the tower to a level above the open bottom and conduit means for recycling the material from the lower portion of the vat to the upper portion thereof at a level below the air inlet.

3. An atmospheric crystallizer cooling unit comprising an elongated, upright hollow cooling tower having an open top and open bottom, a plurality of spray heads mounted near the open top, a tangential air inlet in the tower near the open bottom, helical vanes secured to the inner surface of said tower for directing air in a spirally upward path through the tower, and an open top vat below the tower having side walls extending upwardly around the tower and an overflow for maintaining a liquid level in the vat above the level of the open bottom of the tower and below the air inlet the diameter of the vat being greater than the diameter of the tower.

4. An atmospheric crystallizer cooling unit comprising an elongated, upright hollow cooling tower having an open top and open bottom, a plurality of spray heads mounted near the open top, said spray heads having a downwardly extending outlet and a splash plate below the outlet in the path of liquid discharged therefrom, said plates being inclined downwardly and inwardly, a tangential air inlet in the tower near the open bottom, helical vanes secured to the inner surface of said tower for directing air in a spirally upward path through the tower, and a vat below the tower having side walls extending upwardly around the tower to a level above the open bottom the diameter of the valve being greater than the diameter of the tower.

5. A crystallizer comprising an open top vat having an overflow for saturated solution and a bottom discharge for precipitated crystals, conduit means communicating with the bottom discharge for recycling a portion of the discharged solids to the upper portion of the vat, a cooling tower having a top opening communicating with the atmosphere and an open bottom, said open bottom being disposed in the vat above the crystal bed and below the overflow, a tangential air inlet in the tower near the open bottom and above the overflow, and a spray head in the tower near the top for passing saturated solution downwardly against a countercurrent flow of air said solution being at a temperature above the wet bulb temperature of the air entering said inlet.

6. A crystallizer comprising an open top vat having an overflow for saturated solution and a bottom discharge for precipitated crystals, conduit means communicating with the bottom discharge and with the overflow for recycling a portion of the discharged solids to the upper portion of the vat, a cooling tower having a top opening communicating with the atmosphere and an open bottom, said open bottom being disposed in the vat above the crystal bed and below the overflow, a tangential air inlet in the tower near the open bottom and above the overflow, and a spray head in the tower near the top for passing saturated solution downwardly against a counter-current flow of air.

7. A crystallizer comprising an open top vat having an overflow for saturated solution and a bottom discharge for precipitated crystals, conduit means communicating with the bottom discharge for recycling a portion of the discharged solids to the upper portion of the vat, a cooling tower having a top opening communicating with the atmosphere and an open bottom, said open bottom being disposed in the vat above the crystal bed and below the overflow, a tangential air inlet in the tower near the open bottom and above the overflow, helical vanes secured within the tower above the air inlet for directing air upwardly in a spiral path, and a spray head in the tower near the top for passing saturated solution downwardly against a contercurrent flow of air.

8. Apparatus for separating potassium chloride crystals from brine saturated with sodium chloride and potassium chloride comprising an upright cooling tower having an open top and an open bottom, an open vat below the tower having an overflow above the bottom of the tower and a diameter greater than the diameter of the tower, the bottom of the vat being spaced from the bottom of the tower and defining a quiet crystallizing zone, a tangential air inlet in the lower portion of the tower above the overflow, means for forcing air through the inlet and upwardly through the tower, spray heads in the upper portion of the tower for discharging the brine into the ascending air stream, a discharge conduit communicating with the bottom of the tank, and a second conduit communicating with the discharge conduit for recycling a portion of the discharge into the upper portion of the vat below the air inlet.

9. An atmospheric crystallizer cooling unit comprising a cylindrical, open-ended tower supported within a vat having a liquid overflow outlet and a lower discharge opening for settled solids, the lower end of said tower being above the vat bottom and submerged in the liquid body in the vat, a tangential air inlet in the lower portion of the tower and above the vat overflow level, baffle means supported on the inner wall of the tower for directing ascending air streams upwardly along a spiral course, means associated with said inlet for moving the entering air at high velocity, and conduits means for discharging sprays of solution across the interior space of the tower in its upper portion for gravitational descent through the spiralling air streams to thereby crystallize a soluble constituent of the solution.

EMORY W. DOUGLASS.

References Cited in the file of this patent

UNITED STATES PATENTS

| Number | Name | Date |
|---|---|---|
| 636,888 | Bell | Nov. 14, 1899 |
| 793,110 | Uehling | June 27, 1905 |
| 968,456 | Edwards | Aug. 23, 1910 |
| 1,076,666 | Dorr | Oct. 28, 1913 |
| 1,476,061 | Duvieusart | Dec. 4, 1923 |
| 1,814,300 | Duschak | July 14, 1931 |
| 2,000,038 | Schmalenback | May 7, 1935 |
| 2,347,073 | Beekhuis | Apr. 18, 1944 |
| 2,375,922 | Jeremiassen | May 15, 1945 |